United States Patent
Kaltenbach et al.

(10) Patent No.: US 11,124,064 B2
(45) Date of Patent: Sep. 21, 2021

(54) DRIVE UNIT FOR AN ELECTRIC VEHICLE AND DRIVE AXLE WITH A DRIVE UNIT

(71) Applicant: ZF Friedrichshafen AG, Friedrichshafen (DE)

(72) Inventors: Johannes Kaltenbach, Friedrichshafen (DE); Stefan Renner, Bodman-Ludwigshafen (DE); Kai Bornträger, Langenargen (DE); Michael Trübenbach, Friedrichshafen (DE); Stefan Spühler, Friedrichshafen (DE); Johannes Glückler, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/810,895

(22) Filed: Mar. 6, 2020

(65) Prior Publication Data
US 2020/0282827 A1 Sep. 10, 2020

(30) Foreign Application Priority Data
Mar. 6, 2019 (DE) ...................... 10 2019 202 994.9

(51) Int. Cl.
*B60K 17/04* (2006.01)
*B60K 17/06* (2006.01)
*F16H 3/44* (2006.01)

(52) U.S. Cl.
CPC ............ *B60K 17/046* (2013.01); *B60K 17/06* (2013.01); *F16H 2003/442* (2013.01); *F16H 2200/0039* (2013.01)

(58) Field of Classification Search
CPC ................. B60K 17/046; B60K 17/06; B60K 2001/001; B60K 1/00; B60K 2007/0061;
(Continued)

(56) References Cited

U.S. PATENT DOCUMENTS 5,168,946 A * 12/1992 Dorgan .................. B62D 11/04
 180/6.44
6,139,464 A * 10/2000 Roske .................. B60K 7/0007
 180/65.6
(Continued)

FOREIGN PATENT DOCUMENTS

DE 10 2008 063 533 A1 7/2010
DE 11 2008 003 105 T5 9/2010
(Continued)

OTHER PUBLICATIONS

DE 102017111051B3 to Kurth, machine translation of patent Jun. 2018 (Year: 2018).*
(Continued)

*Primary Examiner* — Justin Holmes
(74) *Attorney, Agent, or Firm* — Finch and Maloney, PLLC; Michael J. Bujold

(57) ABSTRACT

A drive unit for an electric vehicle, having an electric machine and a three-speed shift transmission with first, second and third shift elements, and two planetary sets which are coupled with each other. The first planetary set has a first sun gear shaft, first ring gear shaft and a first carrier shaft. The second planetary set has a second sun gear shaft, a second ring gear shaft and second carrier shaft. The first carrier shaft is fixed to the second ring gear shaft. The first sun gear shaft can be driven by an electric machine. The first ring gear shaft is fixed and output takes place via the second carrier shaft. The first shift elements are actuated to engage a first gear, the second shift elements are actuated to engage the second gear and the third shift elements are actuated to engage the third gear.

26 Claims, 11 Drawing Sheets

(58) Field of Classification Search
CPC ........ B60K 7/0007; B60K 1/02; B60K 17/08;
F16H 2003/442; F16H 2200/0039; F16H
2200/2064; F16H 2200/2094; F16H
2200/2035; F16H 2200/2038; F16H
2200/201; F16H 3/66; F16H 2200/0021;
F16H 2200/2097; F16H 2200/0034; F16H
2200/2007; B60B 7/10; B60B 7/065;
B60B 35/125; B60B 35/001
See application file for complete search history.

(56) References Cited

U.S. PATENT DOCUMENTS

| | | | | |
|---|---|---|---|---|
| 8,640,801 | B2* | 2/2014 | Hennings | ............. B60K 7/0007 180/65.6 |
| 9,242,555 | B2 | 1/2016 | Wenthen | |
| 9,447,848 | B2 | 9/2016 | Beck et al. | |
| 2005/0148421 | A1* | 7/2005 | Keuth | .................... H02K 7/116 475/8 |
| 2012/0258831 | A1* | 10/2012 | Knoblauch | .............. B60K 6/52 475/5 |
| 2017/0175863 | A1* | 6/2017 | Kramer | .................... B60K 1/00 |

FOREIGN PATENT DOCUMENTS

| | | |
|---|---|---|
| DE | 10 2009 002 437 A1 | 10/2010 |
| DE | 10 2013 226 471 A1 | 6/2015 |
| DE | 10 2013 226 473 A1 | 6/2015 |
| DE | 10 2017 111 051 B3 | 6/2018 |
| DE | 102017111051 B3 * | 6/2018 ............... B60K 1/00 |
| DE | 10 2017 011 387 A1 | 6/2019 |
| DE | 10 2018 000 187 A1 | 8/2019 |
| JP | 2013-160248 A | 8/2013 |

OTHER PUBLICATIONS

ZF for Electric Buses. BusToCoach on-line Magazine, May 2017. https://bustocoach.com/maggio_2017_hts_en.

German Search Report Corresponding to 10 2019 202 994.9 dated Dec. 2, 2019.

* cited by examiner

DRIVE UNIT FOR AN ELECTRIC VEHICLE AND DRIVE AXLE WITH A DRIVE UNIT

This application claims priority from German patent application Ser. No. 10 2019 202 994.9 filed Mar. 6, 2019.

FIELD OF THE INVENTION

The invention concerns a drive unit for an electric vehicle, comprising an electric machine, a shift transmission with three speeds, a first, a second, and a third shift element, as well as two planetary sets which are coupled with each other. The invention also concerns a drive axle of an electric vehicle with two drive wheels and at least one drive unit.

BACKGROUND OF THE INVENTION

Through the DE 10 2009 002 437 A1, a purely electrically driven vehicle became known with several variations, wherein one variation in accordance with FIG. 2 has a purely, electrically driven rear axle with independent wheel drives, meaning has a so called wheel-individual drive. Each drive wheel has an assigned electric machine with a following shift transmission, whereby both individual wheel drives are separated from each other. The shift transmissions are designed as two-speed transmission and are actuated by means of a jaw-type shift, meaning that a traction force interrupt takes place during the shifting process. If for instance, only the transmission on the right side, which drives the right wheel, is actuated, a yaw moment occurs about the vertical axis of the vehicle as a result of the interruption of the traction force, which tries to steer the vehicle to the right. To avoid such a yaw moment, the shifting is therefore executed simultaneously on both sides. However, a yaw moment can be desired, for instance when driving a curve, to improve the agility of the vehicle. In such a case, the yaw moment can be created through different torque distribution at the right and the left drive wheel (so called torque-vectoring.)

SUMMARY OF THE INVENTION

It is an object of the invention to provide the drive components for an electrically drivable vehicle of the type mentioned at the beginning, that is to arrange the electric machines and the transmission in a way to save space and weight in the area of the drive axle.

The invention comprises the features of the independent claims. Advantageous refinements result from the dependent claims.

In a first aspect of the invention, a drive unit for an electric vehicle comprises an electric machine and a three-speed shift transmission which has three shift elements, as well as two planetary sets which are coupled with each other. The two planetary sets are coupled with each other through the carrier shaft of a first planetary set and the ring gear shaft of the second planetary set, meaning they are firmly connected with each other. The drive from the electric machine takes place through the sun shaft of the first planetary set, while its ring gear shaft is firmly connected to the housing. The output of the three-speed shift transmission takes place through the carrier shaft of the second planetary set. Different couplings of the transmission shafts can be achieved through the three shift elements for the three gear positions, whereby neutral positions also result, in which the electric machine is decoupled. The first gear is engaged through the engagement of the first shift element: hereby, the second sun shaft is coupled, that is, fixed to the housing. In this case, the two planetary sets work with fixed gear ratios, which, when connected in series, results in transmission of the first gear. Through the engagement of the second shift element, the second planetary set is blocked, meaning that it rotates as block (with a gear ratio of 1:1). Thus, the gear ratio of the second gear derives from the fixed transmission ratio of the first planetary set. Through engagement of the third shift element, the third gear is shifted in which the sun shafts of the first and the second planetary sets are coupled with each other. In this case, an overlay operation occurs, since the planetary sets are coupled which each other twice. The resulting gear ratio results in the gear ratio of the third gear. With the inventive drive unit, in particular with the three-speed shift transmission, increased traction forces which occur in particular with commercial vehicles are achieved. The three-speed manual transmission according to the invention provides the option of omitting the second shift element, that is to create a two-speed transmission by omitting the interlocking variant of the second planetary gear set, which is explained below.

In an additional aspect of the invention, a drive unit for an electric vehicle comprises an electric machine and a two-speed shifting transmission which has two shift elements, as well as two planetary sets coupled to each other, which correspond in structure to the planetary sets of the three-speed shift transmission. To shift the first gear, the first shift element (which corresponds to the first shift element of the three-speed transmission) is engaged, while to shift the second gear, the third shift element, which corresponds to the third shift element of the three-speed transmission, is engaged. Thus, the second shift element of the three-speed transmission has therefore been left out, whereby also the blocking variation of the second planetary set has been omitted. The two-speed transmission thus has the same transmission ratio spread as the three-speed transmission, with a larger gear step between the first gear and the second gear.

In a preferred embodiment, the shift elements are designed as unsynchronized claws. This has the consequence that a traction force interrupt occurs during the shifting operation.

In a further, preferred embodiment, the two-speed transmission and the three-speed transmission have neutral positions, in which none of the three or two shift elements, respectively, is engaged. In these neutral positions the electric machine is decoupled—this enables the electric vehicle to roll freely without the resistance of the rotating electric machine.

In an additional, preferred embodiment, the shift elements, that is to say the three shift elements in the three-speed transmission or the two shift elements in the two-speed transmission, are integrated into a sliding sleeve, which can slide on the sun shaft of the second planetary set. The sun shaft of the second planetary set participates in all shift combinations, so all shift positions, including the neutral position, can be traversed in one direction consecutively on one shaft, which simplifies the shifting mechanism and also enables synchronization.

In an additional, preferred embodiment, the planetary sets, which are arranged coaxially to the rotational axis of the electric machine, can be arranged in a space saving manner with a hollow section of the rotor. In particular, construction space in the axial direction is hereby reduced because the electric machine and the shift transmission are not positioned in the axial direction next to each other, but within each other in the radial direction. This results in a compact construction.

In an additional aspect of the invention, a drive axle of an electric vehicle with two drive wheels has a first and a second drive unit of the type described above. The drive unit according to the invention is thus installed twice in a drive axle of the electric vehicle, specifically as individual wheel drives, the first drive unit drives the first drive wheel, and the second drive unit drives the second drive wheel independently of one another. Because a traction force interrupt occurs in a jaw-type transmission, the gears on both sides must be shifted simultaneously to avoid a yaw moment. Also, when driving each wheel individually, the previously mentioned torque vectoring can be applied in which both drive units supply a different torque distribution at the right and left wheels. Another advantage is the two electric machines are arranged relatively close to one another, so that there is a possibility of cooling the stators of the electric machines together. The common arrangement of both ring gears fixed to the housing also provides advantages regarding the construction space.

In additional preferred embodiments, fixed gear ratios, also called constant gear ratios, can be provided between the shift transmission and the drive wheels, preferably in an area close to the wheels. Thus, an additional ratio of the rotational speeds of the electric machines towards a lower speed is accomplished. The constant gear ratios can be designed as additional planetary sets with a coaxial input and output, or as stationary transmissions with an axial offset between input and output—in this case these are so-called portal axles. The advantage of these portal axles is that the vehicle gets a larger ground clearance. Since the axes of rotation of the electrical machines are thus arranged above the wheel axes, the diameters of the electrical machines can be larger.

In an additional preferred embodiment, the constant transmission stage with axle offset is designed as a planetary set with a fixed carrier, whereby the drive takes place through a planetary wheel and the output through a ring gear. Due to the power flow through several planetary wheels, there is also the advantage of a power split.

In another preferred embodiment, the constant transmission stage with axle offset is designed as spur gear fixed-transmission with idler gears. Thus, a larger axle offset and a split of power is achieved.

According to a further aspect of the invention, a drive axle of an electric vehicle with two drive wheels has a drive unit of the type described above and an axle differential, via which the two drive wheels are driven. The housing of the axle differential is driven by the output shaft of the shift transmission, meaning the second carrier shaft and the output shafts of the differential drive the drive wheels, the constant gear ratio stages are positioned arranged in the area close to the wheels, or are integrated into the drive wheels. This drive axle can be designed with a drive unit as a portal axle.

In a preferred embodiment, it is provided in the three-speed shift that the second shift element is arranged on the sides of the axle differential and that, when the second shift element is engaged, the second carrier shaft is coupled with the second ring gear shaft. This results in a further blocking variant.

In an additional preferred embodiment, the second shift element is positioned between the first and the second planetary sets. When the second shift element, the second sun shaft and the second ring gear shaft are coupled to one another, which results in another blocking variant.

In an additional preferred embodiment, a constant transmission stage, which is preferably designed as a third planetary set, is positioned between the output shaft of the shifting transmission and the differential, the ring gear shaft is fixed in place, the drive of the drive wheels takes place through the sun shaft and the output through the carrier shaft. It is advantageous in this configuration that only three planetary sets are needed for the overall transmission, which can be arranged compactly in the area or within the electric machines, and before the differential.

In an additional preferred embodiment, an axle differential is provided in a drive axle with two drive units. This means that there is no longer a wheel-specific drives. Rather both drive units are connected to one another by the axle differential in that both drive shafts, be it a three-speed transmission or a two-speed transmission, drive the differential housing together. The advantage created by the differential allows load shifting, meaning the shifting can take place without a traction force interruption. The shifting on the right and the left sides are staggered in time so that the electric machine that is not involved in the shifting, can always support the other electric machine at which a shifting is performed. Torque is thus available on both drive wheels during the entire shifting procedure. It is also possible to disconnect one or both electric machines. If one electric machine is decoupled, the other electric machine that is not decoupled can be operated in a favorable efficiency range. If both electric machines are decoupled, there is the possibility of so-called sailing operation, that is free rolling without drag resistance is possible through the rotors of the electrical machines.

In an additional preferred embodiment, the positioning of both planetary sets in the axial direction can be exchanged, so that the first planetary sets are positioned on the inner side and the second planetary sets on the outer side. In this arrangement, the shift elements are also positioned in the central area, meaning immediately adjacent to the center plane. Also, the actuators can be arranged in the central area so that the installation space between the two electric machines can be used for the shift elements and the actuators. Preferably, the actuators can also be arranged in a common radial plane, in particular the center plane, thereby saving installation space in the axial direction.

BRIEF DESCRIPTION OF THE DRAWINGS

Exemplary embodiments of the invention are shown in the drawings and are described in more detail below, further characteristics and/or advantages result from the description and/or the drawings. These show.

DETAILED DESCRIPTION OF THE PREFERRED EMBODIMENTS

Figure 1:
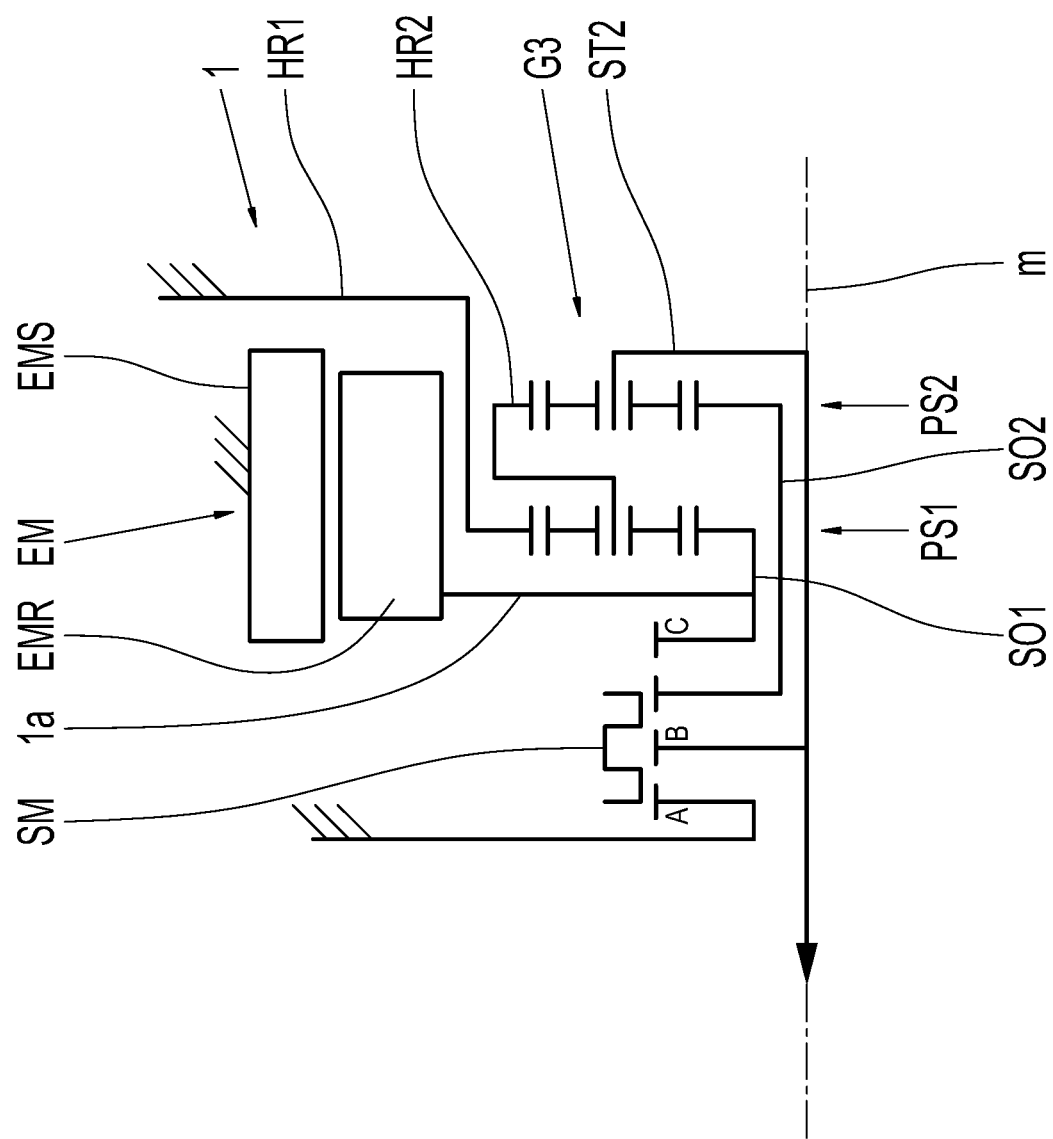
FIG. 1 a drive unit according to the invention with an electric machine and a three-speed shift transmission, FIG. 2 a drive axle of an electric vehicle with individual wheel drive through two drive units, FIG. 3 a drive axle with individual wheel drive as portal axle with a ring gear constant transmission ratio, FIG. 4, 4*a* a drive axle with individual wheel drive as portal axle with a spur gear fixed transmission, and a gear wheel schematic, FIG. 5 a drive axle with a drive unit and a differential, FIG. 6 a drive axle with a drive unit and a three-speed shift transmission with a first blocking variation, FIG. 7 a drive axle with a drive unit and a three-speed shift transmission with a second blocking variation, FIG. 8 a drive axle with a drive unit with a two-speed shift transmission and differential, FIG. 9 a drive axle with a drive unit and a three-speed shift transmission and a constant transmission stage on the output side, before the differential, FIG. 10 a drive axle with two drive units, a differential, and load shiftable shift transmissions, and FIG. 11 a drive axle as in FIG. 10, but with exchanged planetary sets and shift elements positioned at the inner area.

FIG. 1 shows a drive unit 1 for an electric drivable vehicle, in the following also called electric vehicle. The drive unit 1 comprises an electric machine EM, which has an housing-fixed or stationary stator EMS, as well as a rotor EMR with a drive shaft 1a, as well as a three-speed shift transmission G3 with a first shift element A, a second shift element B, and a third shift element C. The three-speed shift transmission G3, also called the shift transmission G3 for short, comprises a first planetary set PS1 and a second planetary set PS2 which is coupled to the first planetary set PS1. The first planetary set PS1 has three shafts, namely a first sun shaft SO1, a first ring gear shaft HR1 fixed to the housing, as well as a carrier shaft ST1. The housing-fixed arrangement is indicated in the drawing in each case by three hatch lines without a reference character. The second planetary set PS2 has also three shafts, namely a second sun shaft SO2, a second ring gear shaft HR2, as well as a second carrier shaft ST2. The first planetary set PS1 is coupled to the second planetary set PS2 via a first carrier shaft ST1 and a second ring gear shaft HR2, i.e., firmly connected and is driven by the driveshaft 1a of the rotor EMR via the first sun shaft SO1. The output of the shift transmission G3 takes place through the second carrier shaft ST2 which is also designated as the output shaft ST2 of the shift transmission G3. The two sun shafts SO1, SO2 are designed as hollow shafts, and the output shaft ST2 extends through these two hollow shafts SO1, SO2. The drive unit 1 has a rotationally symmetrical axis m; the drawing shows only the "upper" half of the drive unit 1, the not shown lower half is designed symmetrically to the upper half. Three gears can be shifted via the three shift elements A, B, C, whereby the following gear steps and shift combinations are possible:

The first shift element A, via which a first gear shifted, connects the second sun shaft SO2 with the housing so that both planetary sets PS1, PS2 each run with a fixed transmission ratio, which multiplied with each other, results in the transmission ratio of the first gear.

The second shift element B, via which the second gear is shifted, blocks the second planetary set PS2, wherein two of the three shafts SO2, HR2, ST2 are connected with each other. In the exemplary embodiment shown, the second sun shaft SO2 is coupled with the second carrier shaft ST2. Because of the blocking, the second planetary set PS2 rotates, for example with a gear ratio 1:1, so that the ratio of the second gear results from the fixed ratio of the first planetary gear set PS1.

The third shift element C, through which the third gear is shifted, connects the second sun shaft SO2 with the first sun shaft SO1. Therefore, a twofold coupling of the first and second planetary set PS1, PS2 is created, which results in a superimposed operation of the first and the second planetary gear set PS1, PS2 with a lower gear ratio for the third gear.

The shift elements A, B, C are preferably designed as unsynchronized claws, wherein in principle frictional, synchronized shifting elements can also be used for the shift functions described. The shift transmission G3 has, beside the three shift position in which either the shift element A, or the shift element B, or the shift elements C are engaged, to neutral positions in which the electric machine EM can be decoupled from the shift transmission G3. This allows a so-called sailing operation, meaning a free rolling of the electric vehicle without losses of the also rotating electric machine EM. As it can be seen in the drawing, the rotor EMR of the electric machine EM has a cylindrical hollow space in which the planetary sets PS1, PS2 can be arranged to save space; in particular, installation space is be saved in the axial direction.

As mentioned above, the second sun shaft SO2 of the second planetary set PS2 is involved in all shift positions—thus, all shift elements, meaning the first, the second, and the third shift element A, B, C can be integrated into one single sliding sleeve SM, which is connected in a rotationally fixed manner in all shift positions with the second sun shaft SO2. The sliding sleeve SM is actuated by an actuator (not shown). Since the gears 1 to 3 can be activated by sliding the sliding of the sliding sleeve SM in one direction, in each case via neutral positions, the shifting elements can be synchronized. Due to the design of the shift elements as claws, shifting takes place with traction force interruptions. As already mentioned, the output shaft, i.e., the carrier shaft ST2 of the second planetary set PS2, forms an inner shaft that extends within the two sun shafts SO1, SO2 designed as hollow shafts, which results in a good bearing base for the hollow shafts SO1, SO2.

The previously described three-speed shifting transmission G3 can be converted to a two-speed transmission (see FIG. 8) by omitting the second shift element B, by which the second planetary set PS2 is blocked, whereby the transmission stepping remains and the center or second gear is dropped. There is therefore a relatively large gradation between the first and the second gear of the two-speed transmission.

The previously described drive unit 1 can—as explained in detail in the following—be applied as a single drive unit which drives two drive wheels, or as dual drive unit, which each drives a single drive wheel, with a three-speed or two-speed shift transmissions.

Figure 2:
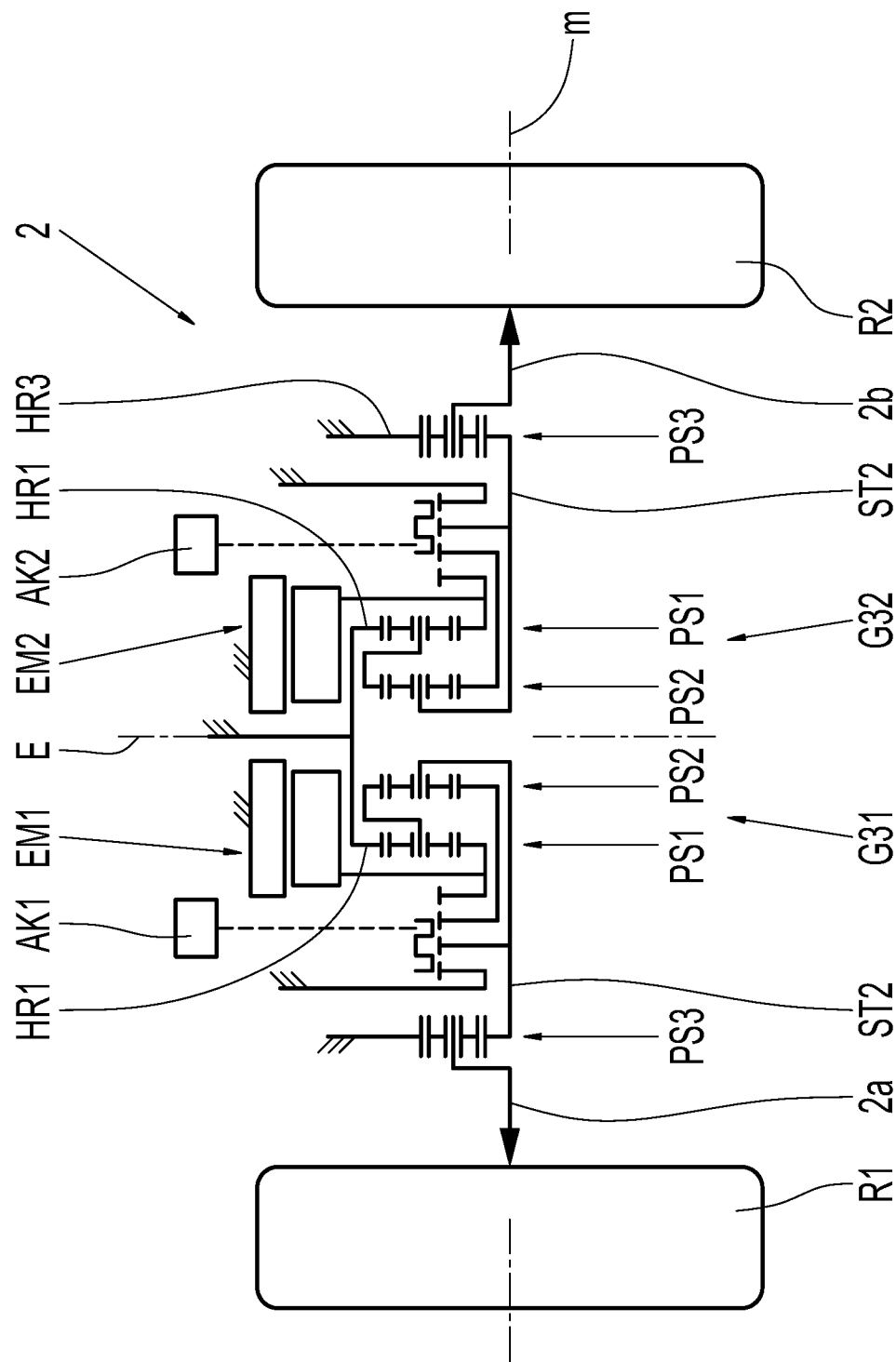

FIG. 2 shows as a further exemplary embodiment of the invention a drive axle 2 of an electric vehicle with a first drive wheel R1 and a second drive wheel R2, whereby the first drive wheel R1 is driven by a first electric machine EM1 via a first three-speed shift transmission G31, and the second drive wheel R2 is driven by a second electric machine EM2 and a second three-speed shift transmission G32, each of which corresponds with the drive unit 1 in accordance with FIG. 1. Both drive sides, the right and left, which are symmetrically to a center plane E and constructed as mirror images, have the same gear ratios. The two planetary sets PS1, PS2 are therefore also marked identically on both sides. With the drive axle 2, each drive wheel is driven by its own electric motor and its own shift transmission—it is therefore a wheel specific drive. In the illustrated embodiment, as mentioned, both shift transmissions G31, G32 are designed as three-speed transmissions, wherein the respective shift elements (here without reference character) are positioned at the outside, meaning at the side of the drive wheels R1, R2 and can be actuated by first and second actuators AK1, AK2. Both drive units are therefore located in the axial direction relatively close together which allows for the possibility of a common cooling for the electric machines EM1, EM2. The two ring gear shafts HR1 of the first and of the second shift transmission G31, G32 are supported together at an housing.

Fixed gear ratios, designed as third planetary sets PS3, are positioned between the shift transmissions G31, G32 and each the drive wheels R1, R2, which are provided for an additional transmission of the rotation speed of the electric machines EM1, EM2 into lower speed. The output shaft ST2 drives the sun shaft of the third planetary set PS3, the ring gear shaft HR3 of which is fixed, and the output takes place via the carrier shaft, which is marked (left) by 2a and (right) by 2b, and each drives a drive wheel R1, R2. The third planetary sets PS3 are positioned near the wheels and can preferably be integrated into the hubs of the drive wheels R1, R2.

Since both drives for the right and for left drive wheel are completely separated, it makes sense that the same gear is driven on both sides so that the same torque acts on the drive wheels R1, R2. Otherwise, a yaw moment would occur (torque around the vertical axis of the vehicle) which would have to be compensated by countermeasures. The gear change—at least when driving straight ahead—should take place simultaneously on both sides because it is linked to a traction force interrupt. A non-simultaneous change of the gear would also result in a disturbing yaw moment. However, the wheel-specific drive can be advantageously be used for a so-called torque vectoring, to make the vehicle more agile, for example in order to achieve a tendency to oversteer when cornering due to different drive torques on the right and left.

Figure 3:
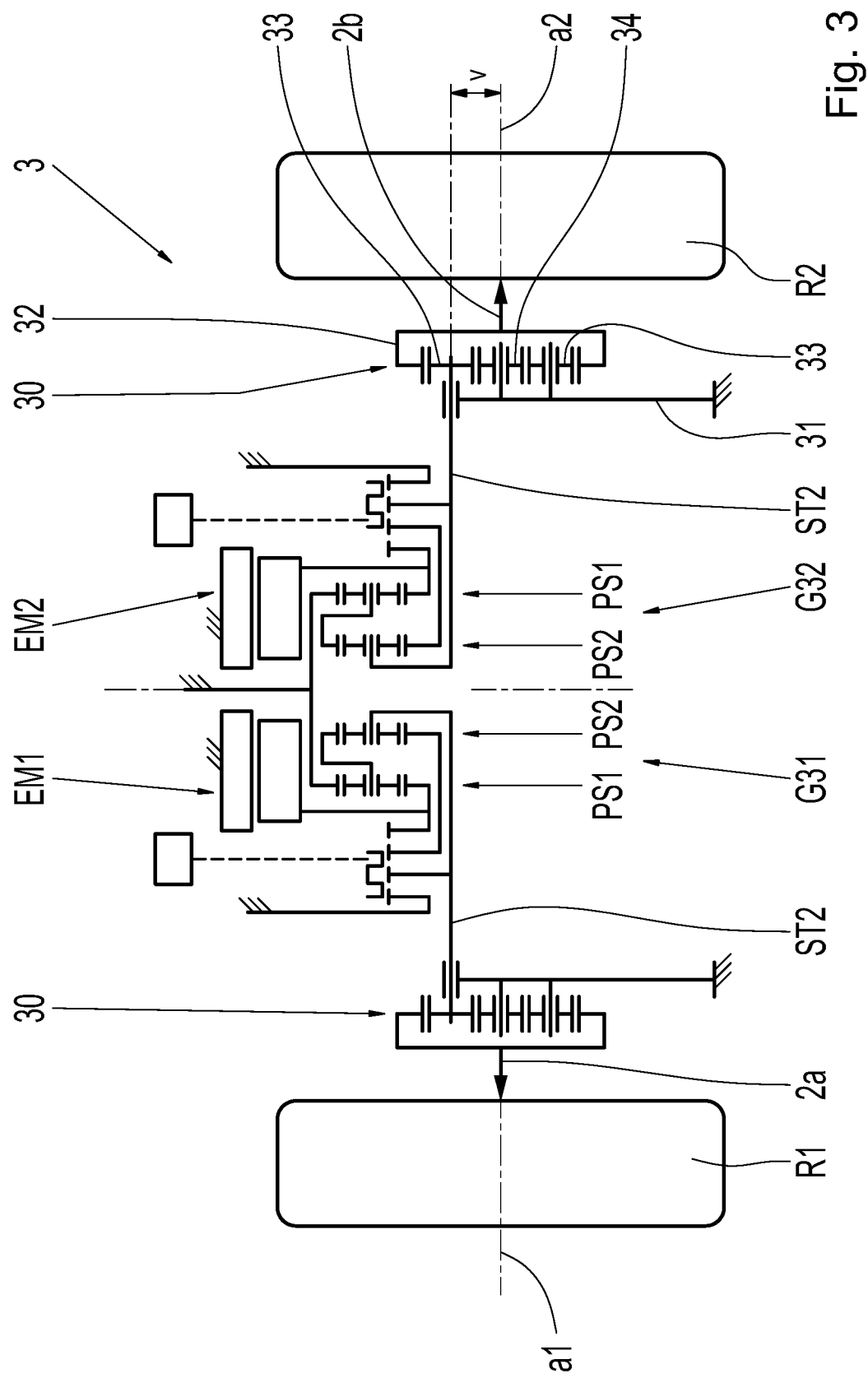

FIG. 3 shows as a further exemplary embodiment of the invention a drive axle 3 which has the same drive units as the drive axle 2 (FIG. 2), meaning two symmetrically positioned electric machines EM1, EM2 with three-speed shift transmissions G31, G32, but designed, however, as a so-called portal axle. Same reference characters are used as previously for the same parts. The fixed gear ratio stage, which is designed in FIG. 2 as the third planetary set PS3 with a coaxial input and output, is replaced in FIG. 3 by two stationary transmissions 30 adjacent the wheel, in which the output shafts 2a, 2b, which are identical to the wheel axles a1, a2, at an axle offset v in reference to the drive shafts ST2. The axle offset v enables a larger ground clearance for the electric vehicle. The stationary transmission 30 is designed as a planetary set with fixed carrier 31, with a rotating ring gear 32, several planetary gears 33, and a sun gear 34. The drive takes place through one of the planetary gears 33, the output through the ring gear 32. An advantageous power split is accomplished via the planetary gears 33 of which several are positioned on the perimeter. Due to the larger ground clearance, electric machines with a large diameter can be applied.

Figure 4:
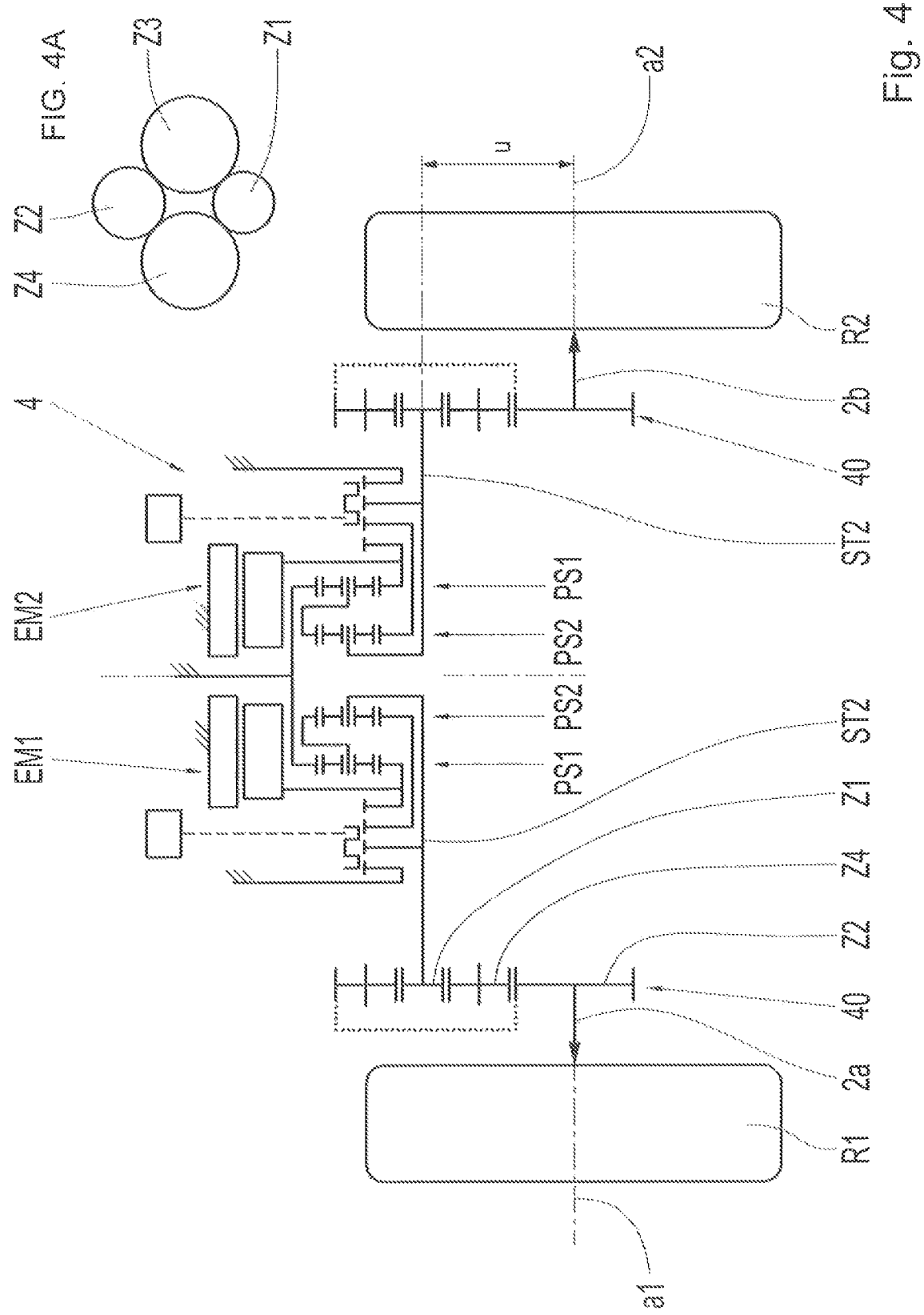

FIG. 4 shows as a further exemplary embodiment of the invention a drive axle 4 which has the same drive units as in FIG. 2 and FIG. 3, wherein again the same reference characters are used for the same parts as above. The drive axle 4 is also designed as a portal axle, however with a different gear ratio stage, which is designed as a spur gear stationary transmission 40 and which has an axle offset u between the drive shafts ST2 and the output shafts 2b. The stationary transmission 40 comprises a drive gear wheel Z1 which is connected rotationally fixed to the driveshaft ST2, an output gear wheel Z2 which is positioned on the output shaft 2a, 2b, as well as two idle gear wheels Z3, Z4, each of which meshes with the drive gear wheel Z1 and the output gear wheel Z2. A gear wheel schematic for the arrangement of the gear wheels Z1, Z2, Z3, Z4 in a radial plane is presented in FIG. 4A. A power split is achieved on one hand via the idle gears Z3, Z4 and on the other hand the relatively large axle offset u, which is larger than the axle offset v of the fixed transmission 30 in FIG. 3.

Figure 5:
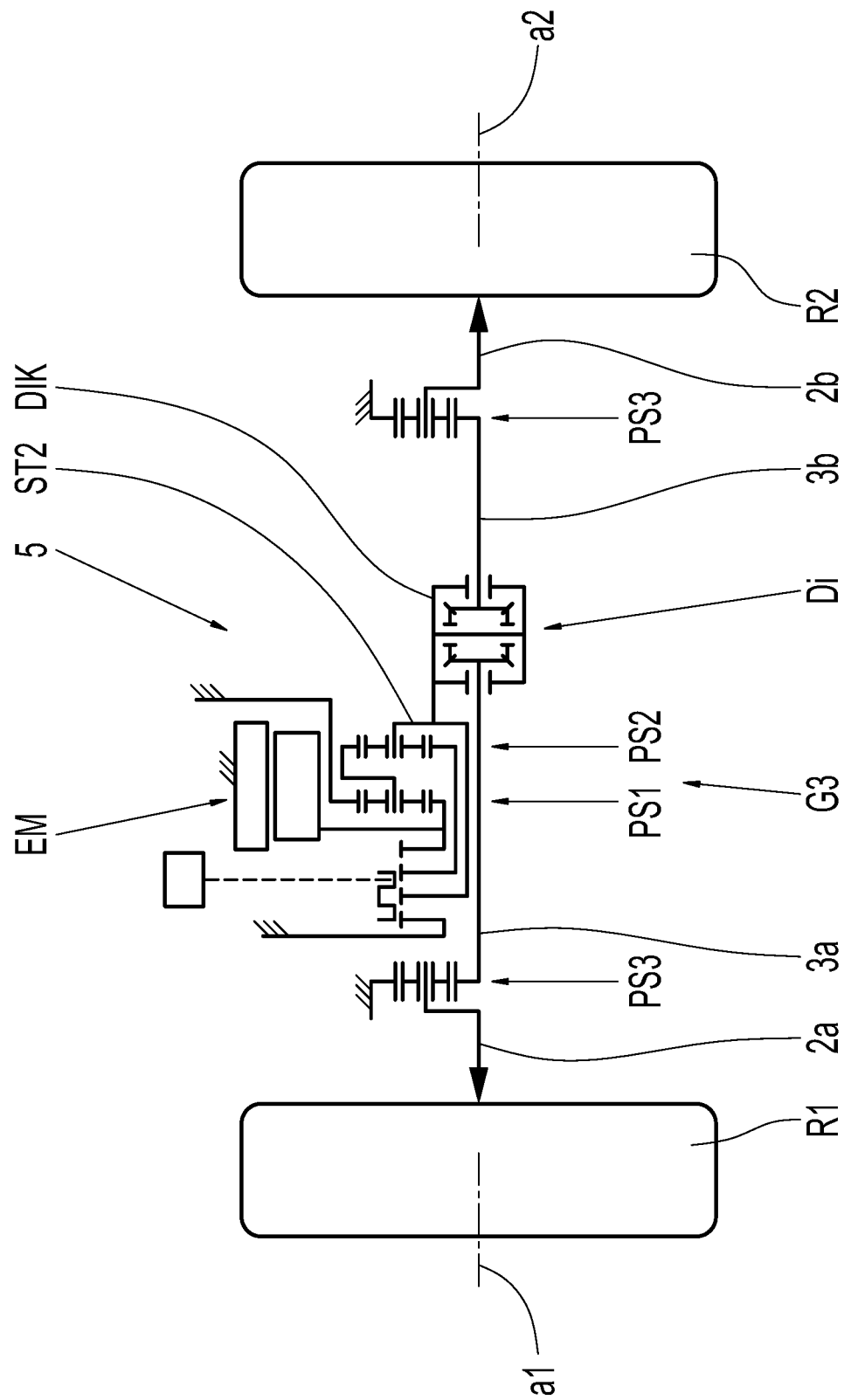

FIG. 5 shows as a further exemplary embodiment of the invention a drive axle 5 with a drive unit which has a corresponding drive unit 1 in accordance with FIG. 1, and an electric machine EM, as well as a three-speed shift transmission G3. Between the output of the shift transmission G3, meaning between the second are shaft ST2, and the two drive wheels R1, R2, is an axle differential DI positioned, also called as the differential DI for short. The differential DI has an housing, it is called differential cage DIK, which is driven by the second carrier shaft ST2. The output shafts 3a, 3b of the differential DI are connected with the inputs of a stationary gear ratio stage, close to the wheel, designed as third planetary set PS3. The output of the third planetary sets PS3 takes place via the output shafts 2a, 2b, designed as carrier shafts, at the drive wheels R1, R2. The drive axle 5 is designed rotationally-symmetrical in reference to the differential output shafts 3a, 3b and wheel axles a1, a2, but non-symmetrically constructed in reference to the axial extension: for instance, the differential DI is eccentrically positioned. The shift transmission G3, with both planetary sets PS1, PS2 can be positioned within the electric machine EM in a space-saving manner, also possibly the differential DI. Therefore and in particular, installation space in the axial direction can be saved. The driveshaft 5 can also—as shown in the exemplary embodiments according to FIG. 3 and FIG. 4—be designed as portal axle with increased ground clearance. Hereby, the third planetary sets PS3 have to be exchanged with stationary transmissions with an axle offset.

Figure 6:
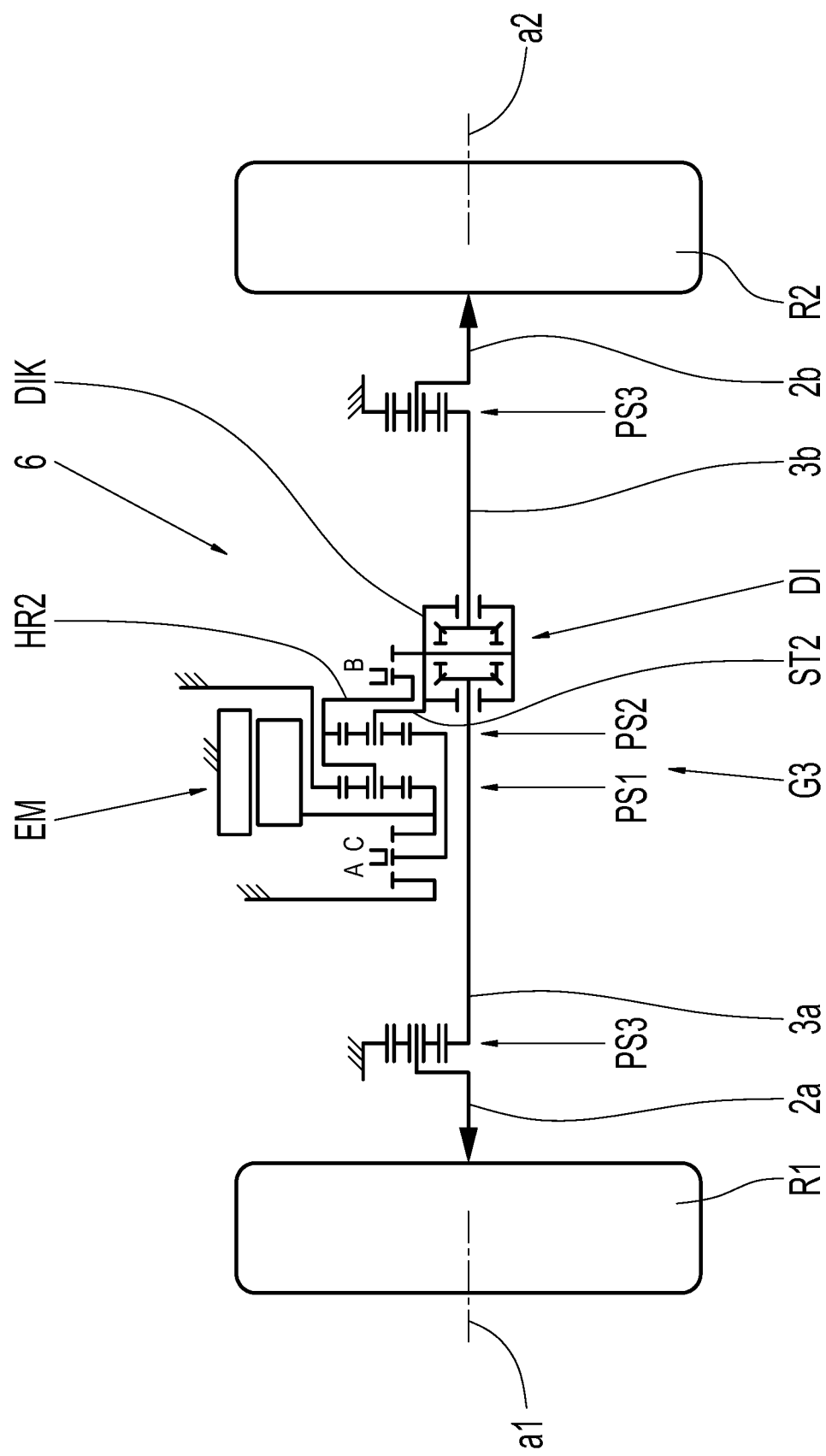

FIG. 6 shows as a further exemplary embodiment of the invention a drive axle 6 which mainly corresponds to the exemplary embodiment in accordance with FIG. 5, meaning it corresponds with the drive axle 5 and has an electric machine EM with a three-speed shift transmission G3 which is modified in reference to the configuration of the shift elements. While the drive axle 5 in accordance with FIG. 5 has all three shift elements A, B, C positioned in the drawing on the left side of the shift transmission G3, and the second carrier shaft ST2 is brought through the two hollow shafts, the drive axle 6 has the shift element B moved to the right side of the shift transmission G3 in the drawing, meaning in the immediate proximity of the differential DI. The presentation for the shift element B in FIG. 6 shows a blocking variation for the second planetary set PS2, wherein the second ring gear shaft HR2 can be coupled with the second carrier shaft ST2, meaning blocked. The second planetary gear set PS2 thus rotates as a block when the shift element B is closed, which corresponds to the second gear, so that the gear ratio for the second gear is determined by the fixed gear ratio of the first planetary gear set PS1. It is advantageous here that the output shaft ST2 does not need to be brought through the two hollow shafts, which results in a gain of installation space in the radial direction. Furthermore, the installation space at the circumference of the differential cage DIK can be used for the arrangement of the shift element B. The two fixed transmission ratio stages, designed as the third planetary stage PS3, have coaxial input and output so that the wheel axles a1, a2 coincide with the axes of the differentia output shafts 3a, 3b. Alternatively, the drive axle 6 can also be designed as a portal axle in accordance with the previous exemplary embodiments, in that stationary gears with an axial offset between the input and output are used for the stationary transmission stages.

Figure 7:
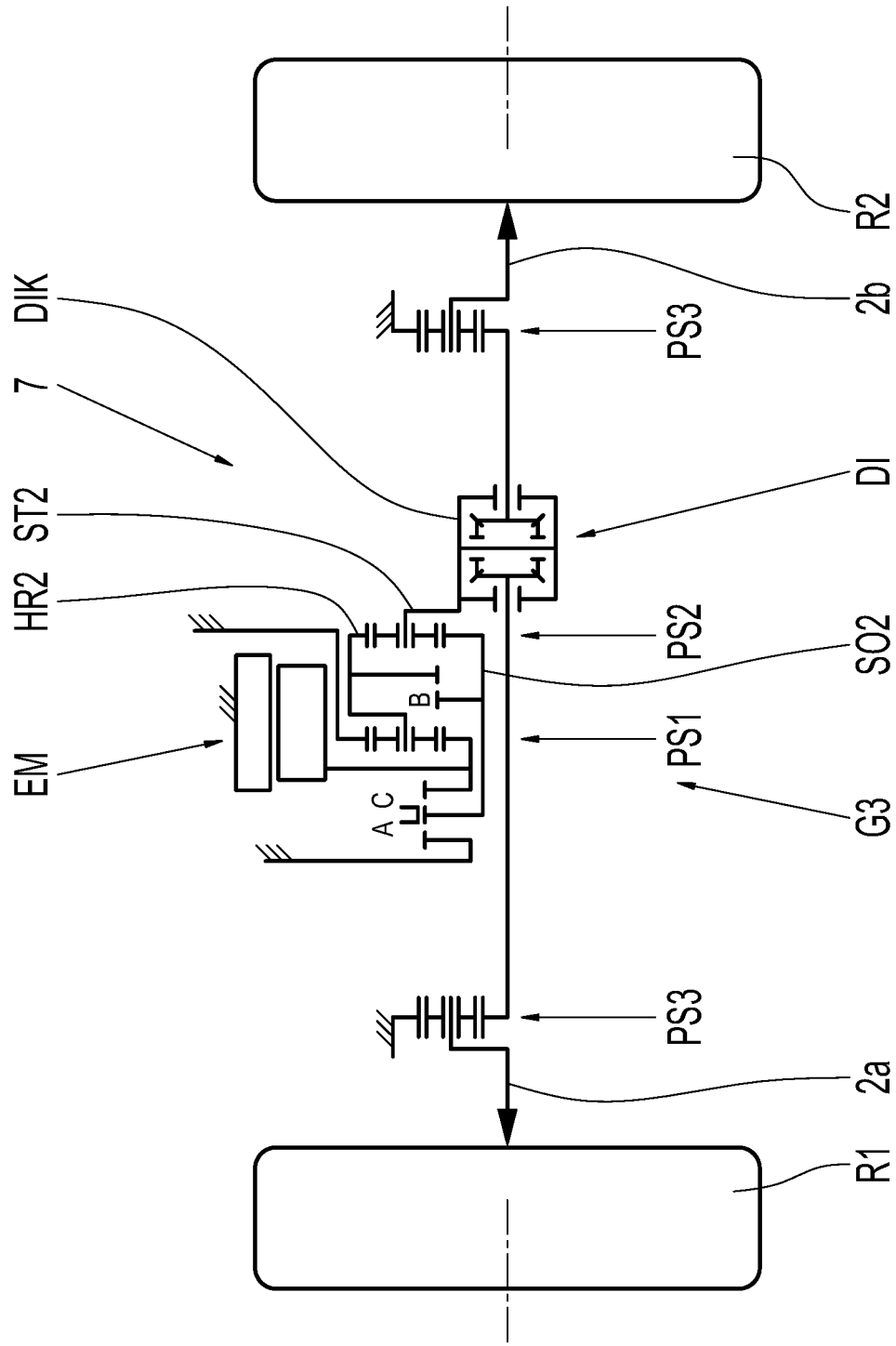

FIG. 7 shows as a further exemplary embodiment of the invention a drive axle 7, which is mainly corresponding with the drive axle 5 and 6 in accordance with FIG. 5 and FIG.

6, meaning it has just one drive unit with an electric machine EM and a shifting transmission G3. Different is here the positioning of the shift element B which is positioned between the first planetary set PS1 and the second planetary set PS2. With an engaged shift element B, the second ring gear shaft HR2 is coupled with the second sun shaft SO2 of the second planetary set PS2—thus, an additional blocking variation is realized for the second planetary set PS2. The output shaft, which is designed as the carrier shaft ST2, is directly connected with the differential cage DIK and therefore does not need to pass through the hollow shaft SO2. The driveshaft 7 can—as described above—be designed as portal axle.

Figure 8:
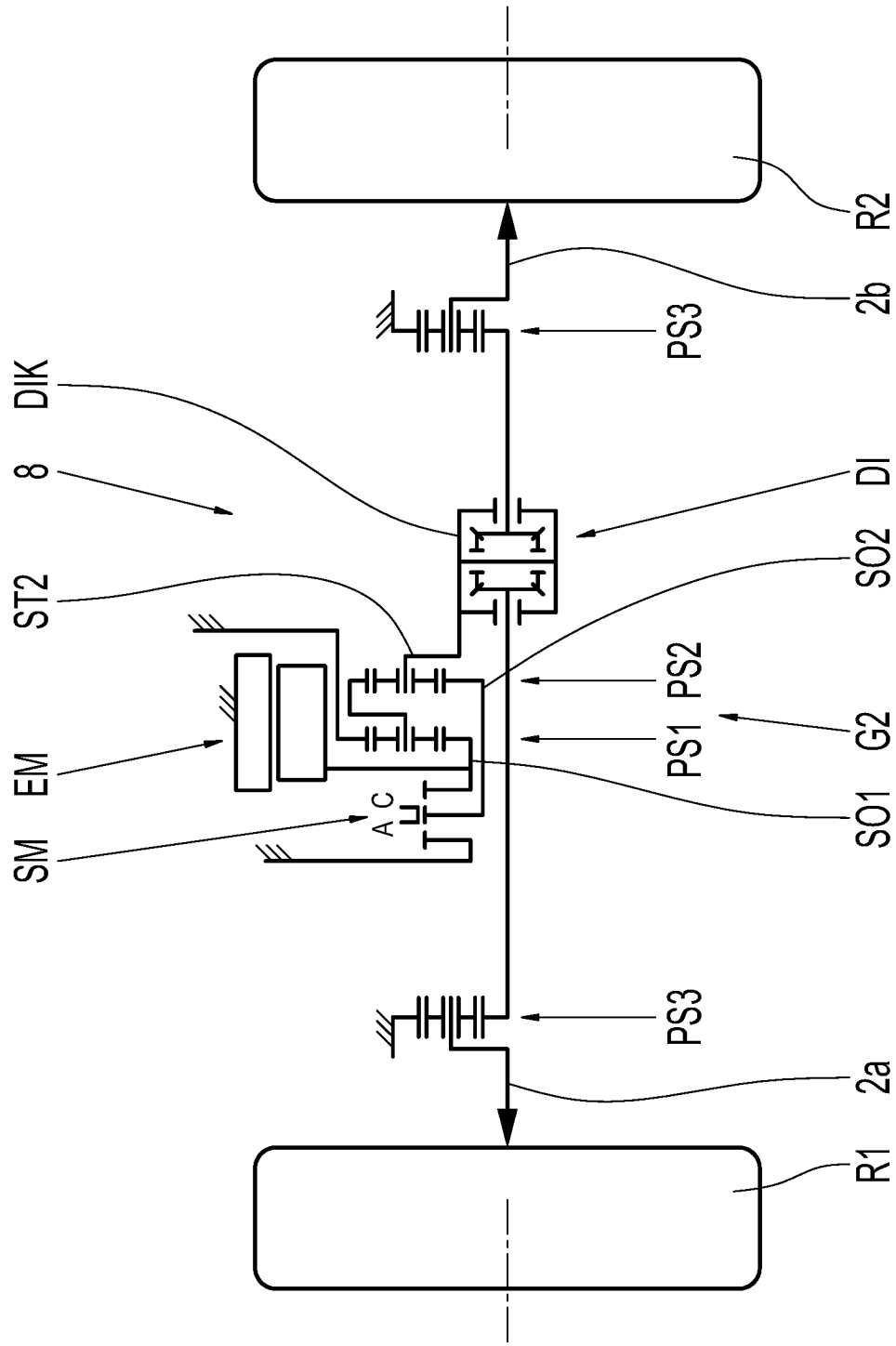

FIG. 8 shows as a further exemplary embodiment of the invention a drive axle 8 with a drive unit, which has an electric machine EM and a two-speed shift transmission G2. As already mentioned above in the description of the drive unit 1 in accordance with FIG. 1, the presented three-speed transmission G3 can be changed by leaving out the second or center shift element B into a two-speed transmission G2, which is presented in FIG. 8. The two shift elements A, C, via which the first and the second gear are shifted, are arranged in the drawing on the left of the shift transmission G2 on the side of the left drive wheel R1. When the shift element A is engaged, the second sun shaft SO2 is connected with the housing so that both planetary sets PS1, PS2 are rotating with a fixed gear ratio. The second gear is created through the engagement of the shift element C, whereby the two sun shafts SO1, SO2 are coupled with each other—this results in a superimposed operation of the two planetary gear sets PS1, PS2, which results in the translation for the second gear. The gear step or the transmission stepping, respectively, between the first and the second gear in the two-speed transmission is therefore the same as between the first and the third gear in the three-speed transmission G3 (FIG. 1). The two-speed transmission G2 has a shorter shifting path for the sliding sleeve SM, because there are only three shift positions, namely "A", neutral, and "C". The output shaft of the two-speed transmission G2, the second carrier shaft ST2, is directly connected with the differential cage DIK so that the design as the inner shaft within the second sun shaft SO2 designed as a hollow shaft is not required. The variation shown here for a two-speed transmission G2 is basically compatible with the three-speed shift transmission G3 for all previous exemplary embodiments, i.e., the three-speed transmission G3 can, if necessary, be replaced by the two-speed transmission G2 by omitting the shift element B.

Figure 9:
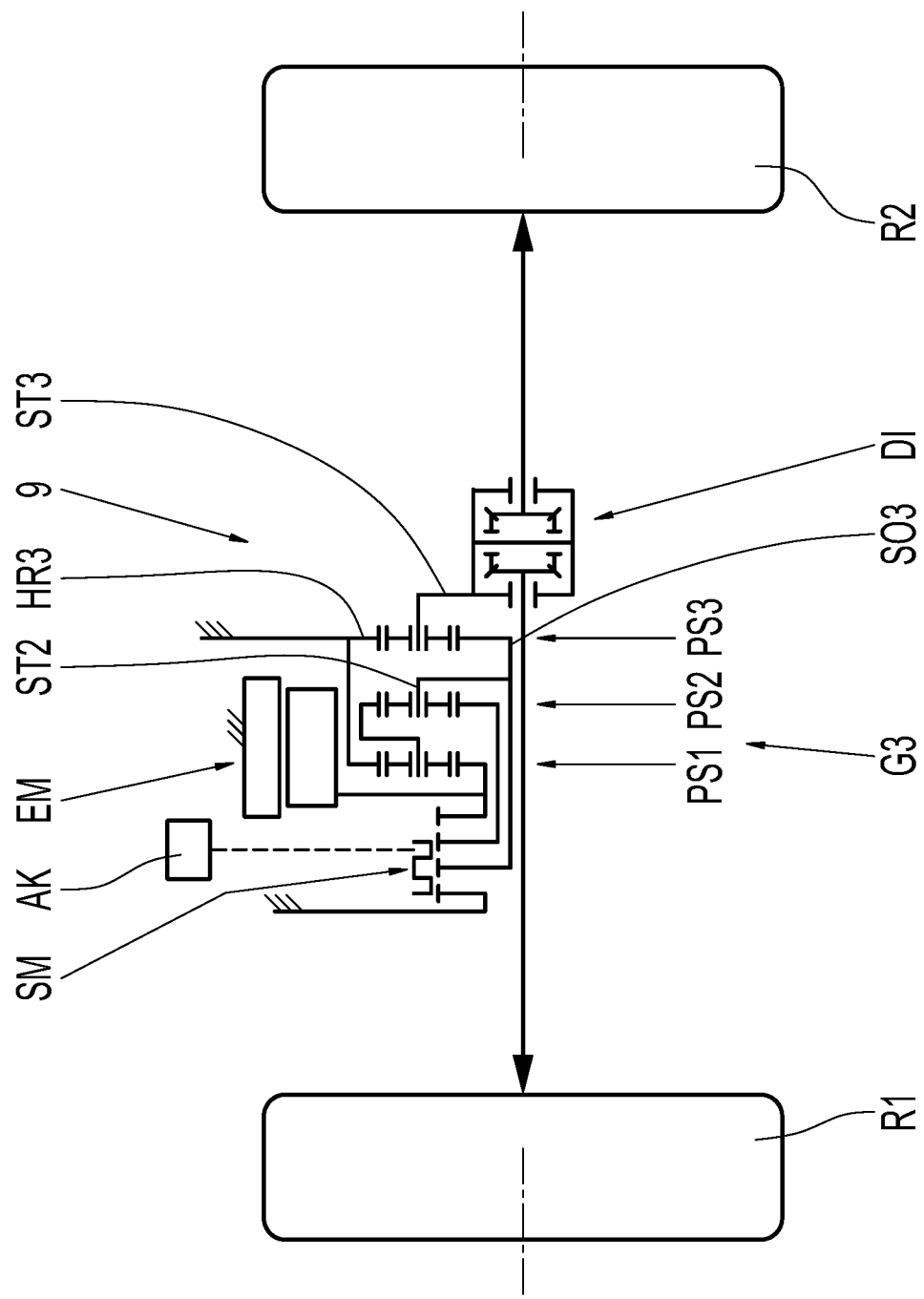

FIG. 9 shows as a further exemplary embodiment of the invention a drive axle 9 with a drive unit which has an electric machine EM, a three-speed transmission G3 and a downstream planetary set PS3 as constant gear ratio. The shift elements (without reference characters) are positioned on the side of the left drive wheel R1 and are activated by a sliding sleeve SM and an actuator AK. The third planetary set PS3 has a driven, third sun shaft SO3, an output carrier shaft ST3, and a fixed ring gear shaft HR3. The third sun shaft SO3 is fixedly connected to the second carrier shaft ST2 of the second planetary set PS2. It is advantageous here that only one fixed gear ratio stage PS3 is required which, viewed in the direction of the power flow, is positioned before the differential DI. In total, only three planetary sets are required for the entire axle drive of the drive axle 9.

Figure 10:
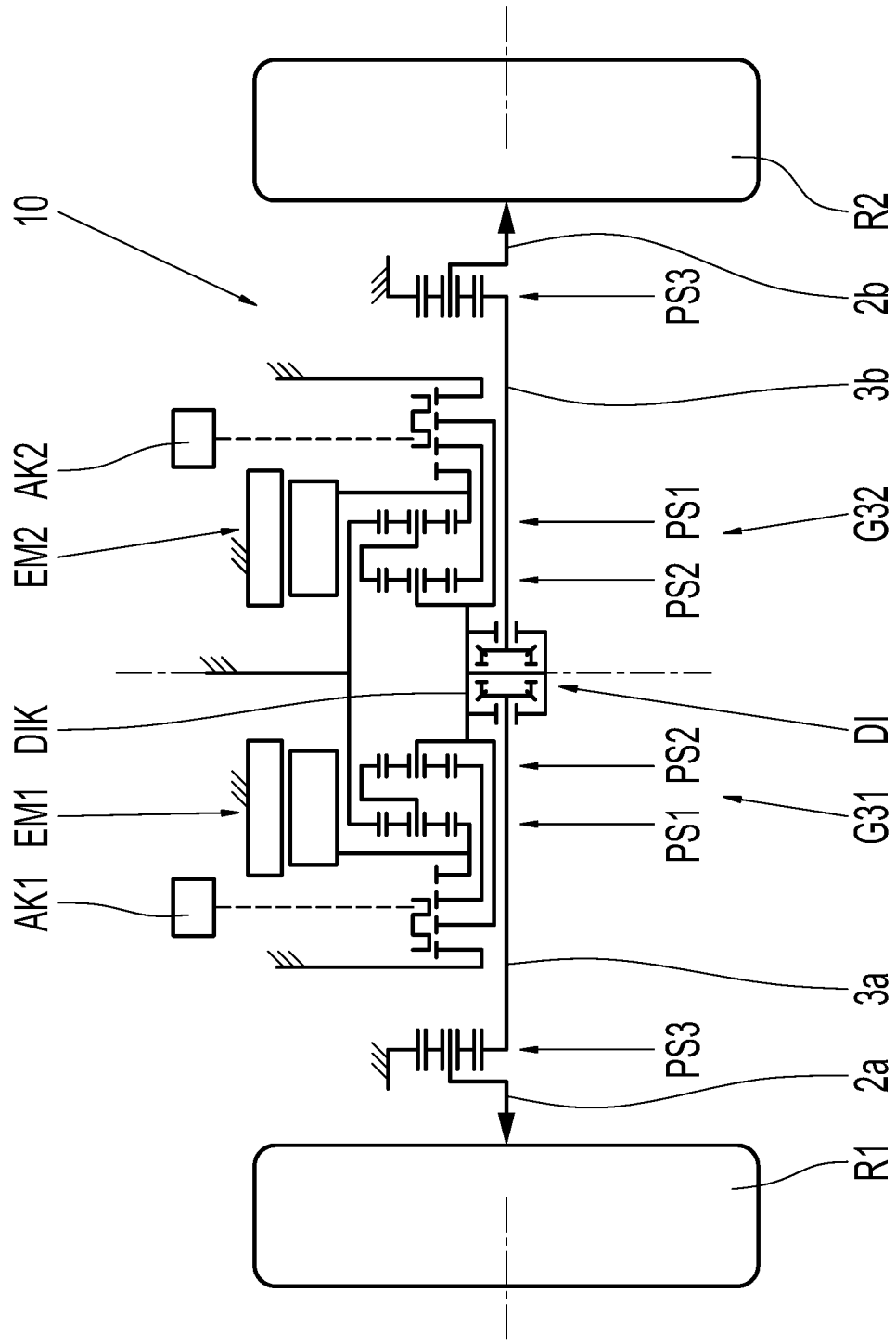

FIG. 10 shows as a further exemplary embodiment of the invention a drive axle 10 with two drive units, as shown as the drive axle 2 in FIG. 2, but with the additional differential DI, which is driven simultaneously by the two carrier shafts ST2 of the second planetary set PS2 (on the right and the left sides). The two output shafts 3a, 3b of the differential DI are connected with the stationary transmission ratio stages, designed as third planetary sets PS3. Thus, both electric machines EM1, EM2 drive both drive wheels R1, R2 through the differential DI. The advantage of this variation is that both shift transmissions G31, G32 are load shiftable, meaning that shifting of the different gears takes place without a traction force interruption. It is possible that the gears on the right of the left side are driven with different gears, since the compensation takes place through the differential DI. It is also possible and it makes sense that the shifting is not done simultaneously on both sides, but at different times, with the electric machine, which is not involved in the shifting, supporting the other side. If for instance on the left side, meaning the second gear is shifted in the shift transmission G31, a traction force interrupt occurs on the left side, but the power flow in the right side, of the second electric machine EM2 through the second shift transmission G32 to the differential DI, is not interrupted, meaning the second electric machine EM2 on the right side supports the left side during the shifting operation. Analogous, this takes place during a shifting of the right side, whereby it is supported by the left side. As it can be seen in the drawing, the shift elements (without reference characters), as well as the two actuators AK1, AK2 are arranged on the outside, meaning on the sides of the drive wheels R1, R2. The electrical machines EM1, EM2 are thus relatively close to one another, so that the two planetary gear sets PS1, PS2 and possibly also the differential DI can be accommodated within the electrical machines EM1, EM2 in a space-saving manner. The drive axle 10 can also—as in the exemplary embodiments shown and explained above—be designed as a portal axle, which results in greater ground clearance.

There is also the possibility that one or both electric machines EM1, EM can be coupled in the neutral position of the shift elements. Thus and during low load requirements, one can drive with just one electric machine, which then can be operated in a more favorable efficiency, which means a savings of drive power. On the other hand and when turning off both electric machines EM1, EM2, a so-called sailing operation is possible, meaning a free rolling of the vehicle without losses in the rotating electric machines.

Figure 11:
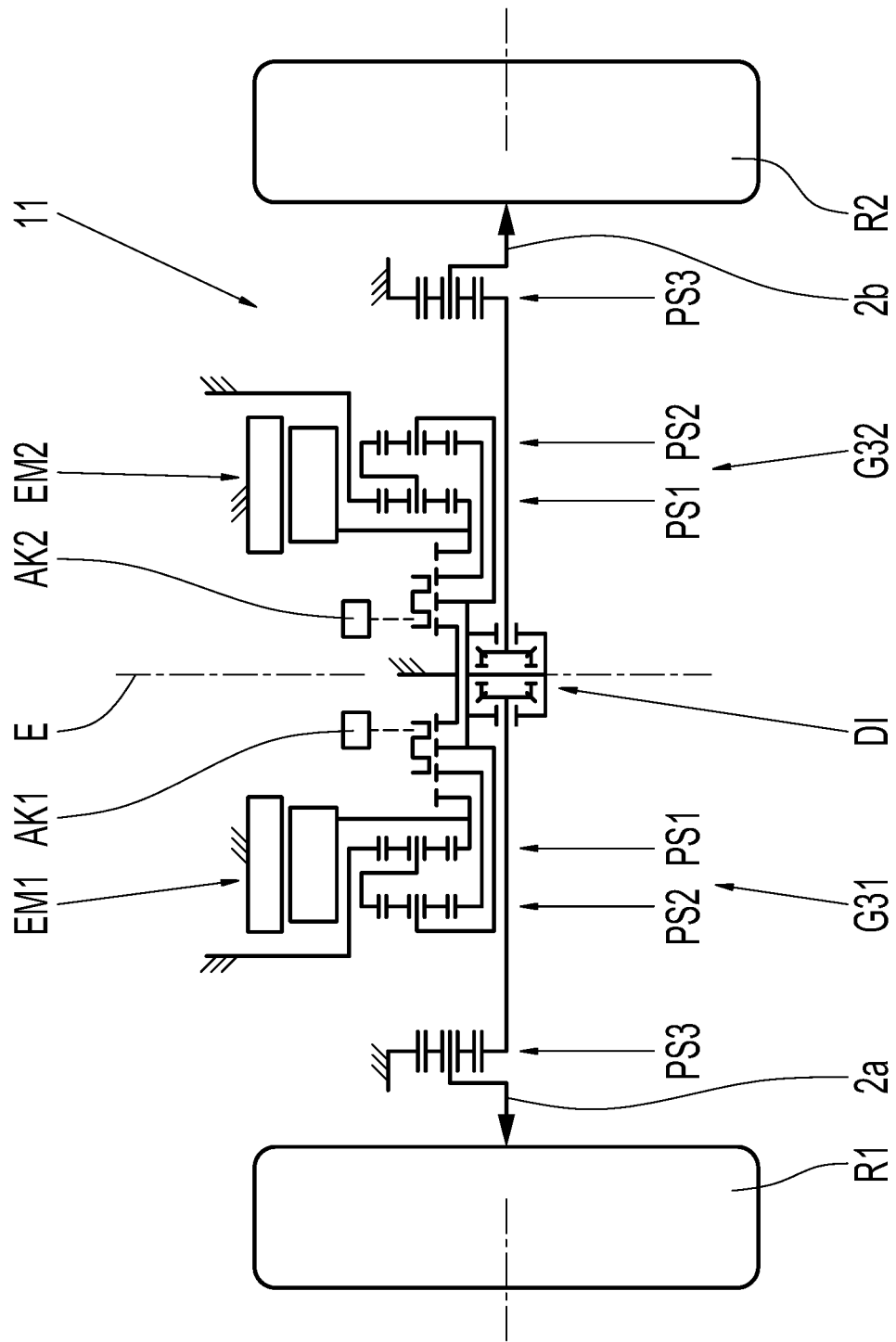

FIG. 11 shows as a further exemplary embodiment of the invention a drive axle 11, which mainly corresponds with the drive axle 10 in accordance with FIG. 10, meaning it has two drive units with two electric machines EM1, EM2 and two three-speed shift transmissions G31, G32. Different is here that the shift elements (without reference characters) and the respective actuators AK1, AK2 are centrally arranged, meaning adjacent the center plane E. Further hereby, the first and the second planetary sets PS1, PS2 are swapped in the axial direction, so that both the first planetary sets PS1 are positioned inside (adjacent the center plane E) and both of the second planetary sets PS2 are positioned at the outside. It is advantageous here that the installation space between the two electric machines EM1, EM2 can be utilized for the arrangement of the differential DI, the shifting elements, as well as the actuators which preferably can also be arranged in a common radial plane.

REFERENCE CHARACTERS

1 Drive Unit
1a Drive Shaft
2 Drive Axle
2a Drive Shaft
2b Drive Shaft

3 Drive Shaft
3a Output Shaft Differential
3b Output Shaft Differential
4 Drive Axle
5 Drive Axle
6 Drive Axle
7 Drive Axle
8 Drive Axle
9 Drive Axle
10 Drive Axle
11 Drive Axle
30 Stationary Transmission (Portal Stage)
31 Carrier (fixed)
32 Ring Gear
33 Planetary Gear
34 Sun Gear
40 Stationary Transmission (Portal Stage)
A First Shift Element
a1 Axis first Drive Wheel
a2 Axis second Drive Wheel
AK1 First actuator
AK2 Second actuator
B Second Shift Element
C Third Shift Element
DI Differential
DIK Differential Cage, -Housing
E Center Plane
EM Electric Machine
EM1 First Electric Machine
EM2 Second Electric Machine
EMR Rotor
EMS Stator
G2 Two-Speed Transmission
G3 Three-Speed Transmission
G31 First Three-Speed Transmission
G32 Second Three-Speed Transmission
HR1 First Ring Gear Shaft
HR2 Second Ring Gear Shaft
M Rotation Axis
PS1 First Planetary Set
PS2 Second Planetary Set
PS3 Third Planetary Set
R1 First Drive Wheel
R2 Second Drive Wheel
SO1 First Sun Shaft
SO2 Second Sun Shaft
SO3 Third Sun Shaft
SM Sliding Sleeve
ST1 First Carrier Shaft
ST2 Second Carrier Shaft
ST3 Third Carrier Shaft
u Axle Offset
v Axle Offset
Z1 First Drive Gear Wheel
Z2 Second Drive Gear Wheel
Z3 Third Drive Gear Wheel
Z4 Fourth Drive Gear Wheel

The invention claimed is:

1. A drive unit for an electric vehicle, the drive unit comprising an electric machine and a three-speed shift transmission with a first shift element, a second shift element, a third shift element, and first and second planetary sets which are coupled to each other;

the first planetary set has a first sun shaft, a first ring gear shaft and a first carrier shaft, and the second planetary set has a second sun shaft, a second ring gear shaft, and a second carrier shaft;

the first carrier shaft is fixedly connected to the second ring gear shaft, the first sun shaft is drivable by the electric machine, the first ring gear shaft is positionally fixed, output takes place via the second carrier shaft;

the first shift element is actuatable to engage a first gear, the second shift element is actuatable to engage a second gear, and the third shift element is actuatable to engage a third gear; and the second sun shaft is coupleable, via the first shift element, to a housing.

2. The drive unit for the electric vehicle according to claim 1, wherein two of the second sun shaft, the second ring gear shaft, and the second carrier shaft are connectable by engagement of the second shift element to block the second planetary set.

3. The drive unit for an electric vehicle according to claim 1, wherein the second sun shaft is coupleable to the first sun shaft via the third shift element.

4. The drive unit according to claim 1, wherein the first, the second and the third shift elements are designed as non-synchronized claws.

5. The drive unit according to claim 1, wherein the shift transmission has a neutral position in which the electric machine is decoupled.

6. The drive unit according to claim 1, wherein the first, the second and the third shift elements are integrated in a sliding sleeve that is arranged to slide on the second sun shaft.

7. The drive unit according to claim 1, wherein the first sun shaft and the second sun shaft are hollow shafts, and the second carrier shaft, which is a drive output shaft of the shift transmission, extends through the first and the second sun shafts.

8. The drive unit according to claim 1, wherein at least one of the first and the second planetary sets is at least partially positioned within the electric machine.

9. A drive axle of an electric vehicle with first and second drive wheels, a first and a second drive unit, wherein the first and the second drive units are each designed as the drive unit according to claim 1, wherein the first drive wheel is drivable by the first drive unit with a first electric machine and a first shift transmission, and that the second drive wheel is drivable by the second drive unit with a second electric machine and a second shift transmission, and both the first and the second drive units are arranged symmetrically relative to a center plane that extends centrally between the first and the second drive wheels, and the first and the second shift transmissions have the same gear ratios.

10. The drive axle according to claim 9, wherein an output shaft of the first shift transmission drives the first drive wheel and an output shaft of the second shift transmission drives the second drive wheel.

11. The drive axle according to claim 10, wherein between the output shafts of the first and the second shift transmissions and the first and the second drive wheels, a stationary transmission is arranged.

12. The drive axle according to claim 11, wherein the stationary transmission is a third planetary set with a fixed ring gear shaft.

13. The drive axle according to claim 9, wherein the drive axle is a portal axle, and the drive shafts of the first and the second shift transmissions and axes of the first and the second drive wheels have each an axis offset.

14. The drive axle according to claim 11, wherein the stationary transmission is a planetary set with a fixed carrier.

15. The drive axle according to claim 13, wherein the stationary transmission is a spur gear transmission with a drive gear wheel, a driven gear wheel, as well as two idle gears.

16. The drive axle according to claim 9, wherein the first and the second shift elements of the first and the second shift transmissions are actuatable via a first and a second actuator, respectively.

17. The drive axle of an electric vehicle with first and second drive wheels and a drive unit designed as the drive unit according to claim 1, wherein the first drive wheel and the second drive wheel are drivable by the electric machine and the shift transmission via a differential.

18. The drive axle according to claim 17, wherein the shift element is positioned next to the differential and the second carrier shaft is couplable to the second ring gear shaft via the shift element to block the second planetary set.

19. The drive axle according to claim 17, wherein the shift element is positioned between the first and the second planetary set, and a blocking is created by the shift element of the second planetary set by coupling the second ring gear shaft with the second sun shaft.

20. The drive axle according to claim 17, wherein a stationary transmission is arranged between the output shaft of the shift transmission and a differential.

21. The drive axle according to claim 20, wherein the stationary transmission is designed as a third planetary set with a third sun shaft, a third ring gear shaft and a third carrier shaft, the third ring gear shaft is positionally fixed, and the output shaft of the shift transmission drives the third sun shaft, and the third carrier shaft forms output of the third planetary set.

22. The drive axle according to claim 9, wherein an axle differential with a differential case is arranged between the first and the second drive wheels, and the axle differential is drivable by both of the output shafts of the first and the second shift transmissions.

23. The drive axle according to claim 22, wherein the first planetary sets and the first, the second and the third shift elements thereof are each positioned on sides of the first and the second shift transmissions facing a center plane.

24. The drive axle according claim 23, wherein the first, the second and the third shift elements are actuatable by first and second actuators, which are arranged in a common radial plane.

25. A drive unit for an electric vehicle, the drive unit comprising an electric machine, and a two-speed shift transmission with a first shift element, a third shift element, and first and second planetary sets which are coupled to each other;

the first planetary set has a first sun shaft, a first ring gear shaft, and a first carrier shaft, and the second planetary set has a second sun shaft, a second ring gear shaft and a second carrier shaft;

the first carrier shaft is fixedly connected to the second ring gear shaft, the first sun shaft is drivable by the electric machine, the first ring gear shaft is positionally fixed, and output takes place via the second carrier shaft;

the first shift element is actuatable to engage a first gear, and the third shift element is actuatable to engage a second gear; and the second sun shaft is coupleable to the first sun shaft via the third shift element.

26. The drive unit for an electric vehicle according to claim 25, wherein the second sun shaft is coupleable to a housing via the first shift element.

* * * * *